March 1, 1966  F. KRUMBEIN ETAL  3,238,008
SWITCH DEVICE FOR MOTION PICTURE PROJECTOR
Filed Dec. 16, 1964
6 Sheets-Sheet 1

March 1, 1966  F. KRUMBEIN ETAL  3,238,008
SWITCH DEVICE FOR MOTION PICTURE PROJECTOR
Filed Dec. 16, 1964  6 Sheets-Sheet 4

March 1, 1966      F. KRUMBEIN ETAL      3,238,008
SWITCH DEVICE FOR MOTION PICTURE PROJECTOR
Filed Dec. 16, 1964

United States Patent Office 3,238,008
Patented Mar. 1, 1966

3,238,008
SWITCH DEVICE FOR MOTION PICTURE PROJECTOR
Fritz Krumbein, Stuttgart-Mohringen, and Rudolf Taesler, Stuttgart, Germany, assignors to Zeiss Ikon Aktiengesellschaft, Stuttgart, Germany
Filed Dec. 16, 1964, Ser. No. 418,774
Claims priority, application Germany, Jan. 15, 1964, Z 10,579
10 Claims. (Cl. 352—169)

The invention relates to a switching device to be used in motion picture projectors.

Switching devices for motion picture projectors are known which provide for a number of different types of operation, such as forward and rearward movement of the film and even a still projection, so as to facilitate as much as possible the projection of motion pictures by amateurs. With these known projectors it is not possible, however, to move the pictures individually step by step as it can, for example be done with transparencies or so called slides in slide projectors. Still such an operation is frequently desired, particularly when the motion picture projector at the same time is also used in a workshop.

It is the object of the invention to create a motion picture projector provided with a switch device which in a simple manner in addition to a regular motion picture showing makes it possible to switch to a standstill projection of individual pictures and to a slow motion picture projection. The switch device is of a simple construction and operation.

The invention provides for the purposes stated a combination of devices for projecting motion pictures, single pictures and still pictures in such a manner that a handle for a first switch for turning the projector motor on and off is operatively connected with a switching member which is acted upon by a spring and which in one operative position keeps a second switch closed which is arranged in the supply circuit of the projector motor, and in another operative position keeps the same second switch open. This switching member is in operative connection with a locking member serving to lock the projector motor. This locking member in its release position for the projector motor locks the switching member in a position which keeps the second switch in the projector motor circuit closed, while the locking member itself is locked in its position locking the projector motor by the switching member when the latter is in the position where it keeps the second switch in the motor circuit open, whereby the locking member is brought into operative connection with a locking nose moved simultaneously with the rotary shutter for the camera objective and with a control cam likewise moved simultaneously with the rotary shutter in such a manner that the control cam scanned by the locking member under the action of a spring so controls a reciprocal movement of the locking member between the locking position and the release position that the locking member in each cycle is brought at least once into a locking position, while the locking nose and the locking cam of the locking member evade each other.

The invention will now be described in more detail with reference to the accompanying drawings in which details not essential for the present invention have been omitted.

Figure 5:
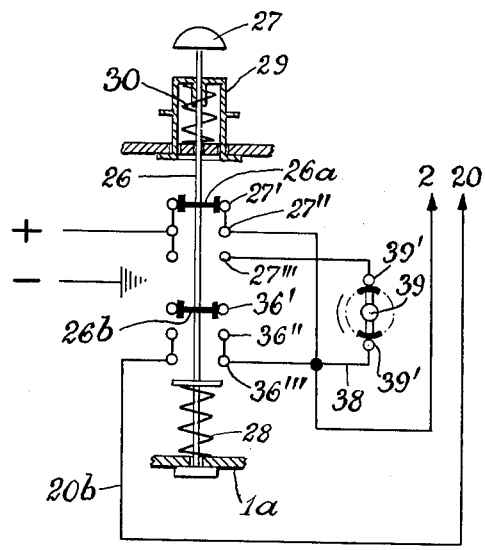
Figure 6:
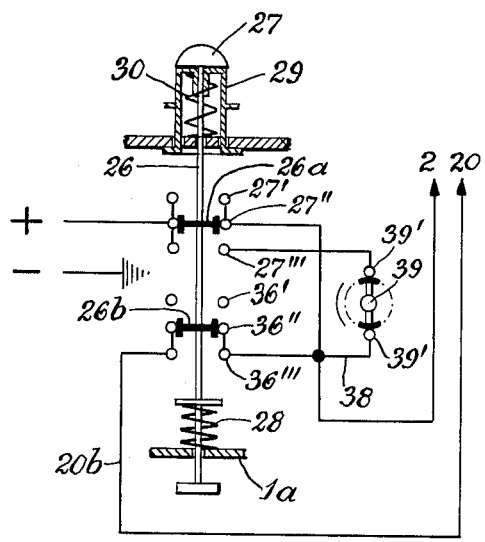
Figure 7:
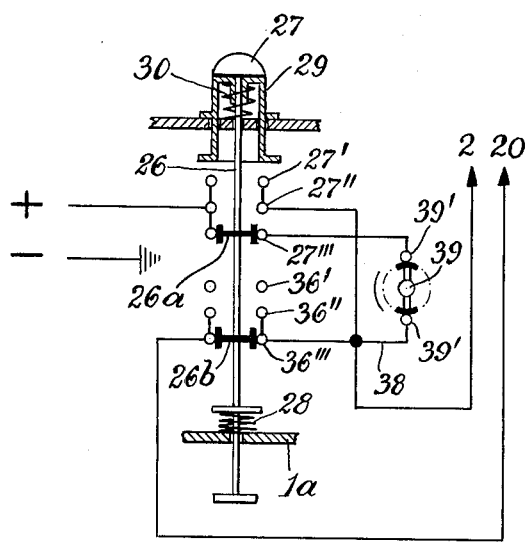
Figure 8:
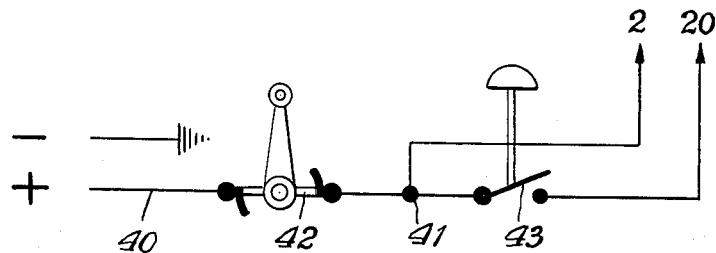
Figure 9:
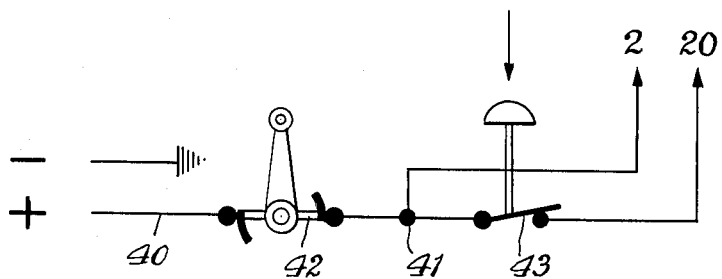
Figure 10:
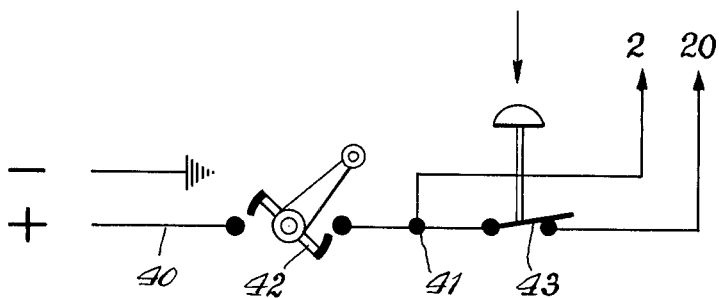

FIGS. 5, 6 and 7 illustrate each a different position of a switch element of a switching device in which the function of a manually operable switch is changed and is supplemented by a switch which is periodically opened and closed; and FIGS. 8, 9 and 10 illustrate a switch element of a switching device with a different arrangement of the manually operable switch parts and a manually operable crank switch for moving individual pictures and performing a slow motion effect.

Referring to the drawings, a housing 1 of a motion picture projector has mounted therein a drive motor 2 for driving the picture changing mechanism and the shutter associated with the camera objective. This motor 2 is connected by an endless drive belt 3 with a circular disc 4 which is provided on its circumference with a locking nose 5. The disc 4 is non-rotatably secured on a shaft 6 which carries the not illustrated shutter for the camera objective. On the same shaft 6 is also non-rotatably mounted a control cam 7 having the form of an eccentric. On a pin 8 in the housing 1 is pivotally mounted an angular lever 9, one arm 10 of which has one end of a tension spring 12 fastened to it at 11. The other arm 14 of the angular lever 9 engages the control cam 7. The other end of the spring 12 is attached to a stationary pin 13. The arm 14 of the angular lever 9 is laterally offset with respect to the arm 10 and is provided with a locking shoulder 15 adapted to be moved into the range of movement of the locking nose 5. In the same plane with the arm 14 of the angular lever 9 is arranged a double-armed lever 16 pivotally mounted between its ends on a stationary pin 17. This double-armed lever 16 has on its one end a recess 18 and on its other end a downwardly extending nose 19. The movable armature of an electromagnet 20 is connected by means of a pin 21 to the double-armed lever 16 between the nose 19 and the pin 17, while between the pin 17 and the recess 18 one end of a tension spring 22 is attached at 23 to the double-armed lever 16. The other end of this spring 22 is attached to a pin 24 which is fixedly mounted in the housing 1. In the operation range of the nose 19 is positioned a leaf spring switch 25 which is fixed to the housing 1 and in the inoperative position of the double-armed lever 16 is kept closed. This leaf spring switch 25 is arranged in the supply circuit for the drive motor 2.

Figure 1:
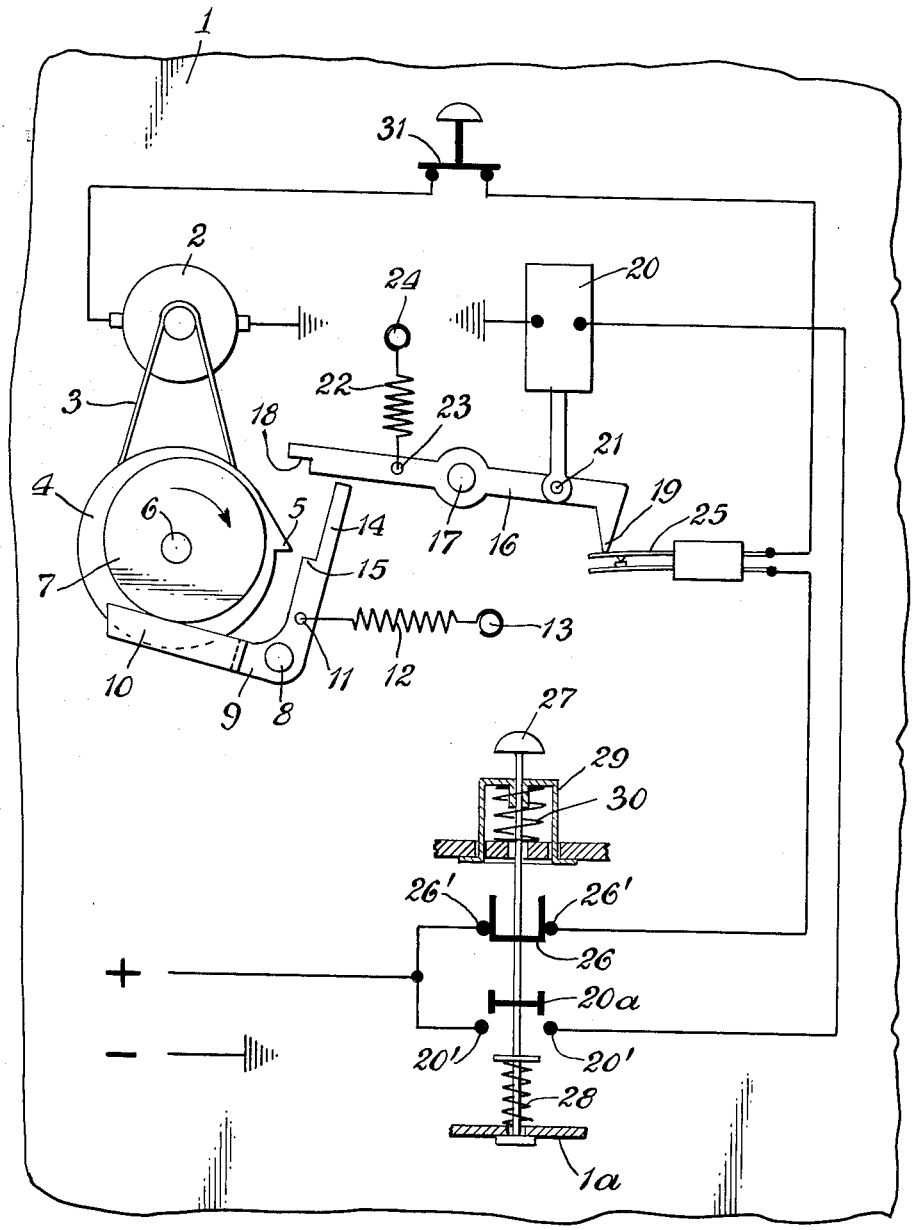
FIG. 1 illustrates a switching device in accordance with the invention in its rest position when the conventional forward movement is ready to be operated.
Figure 2:
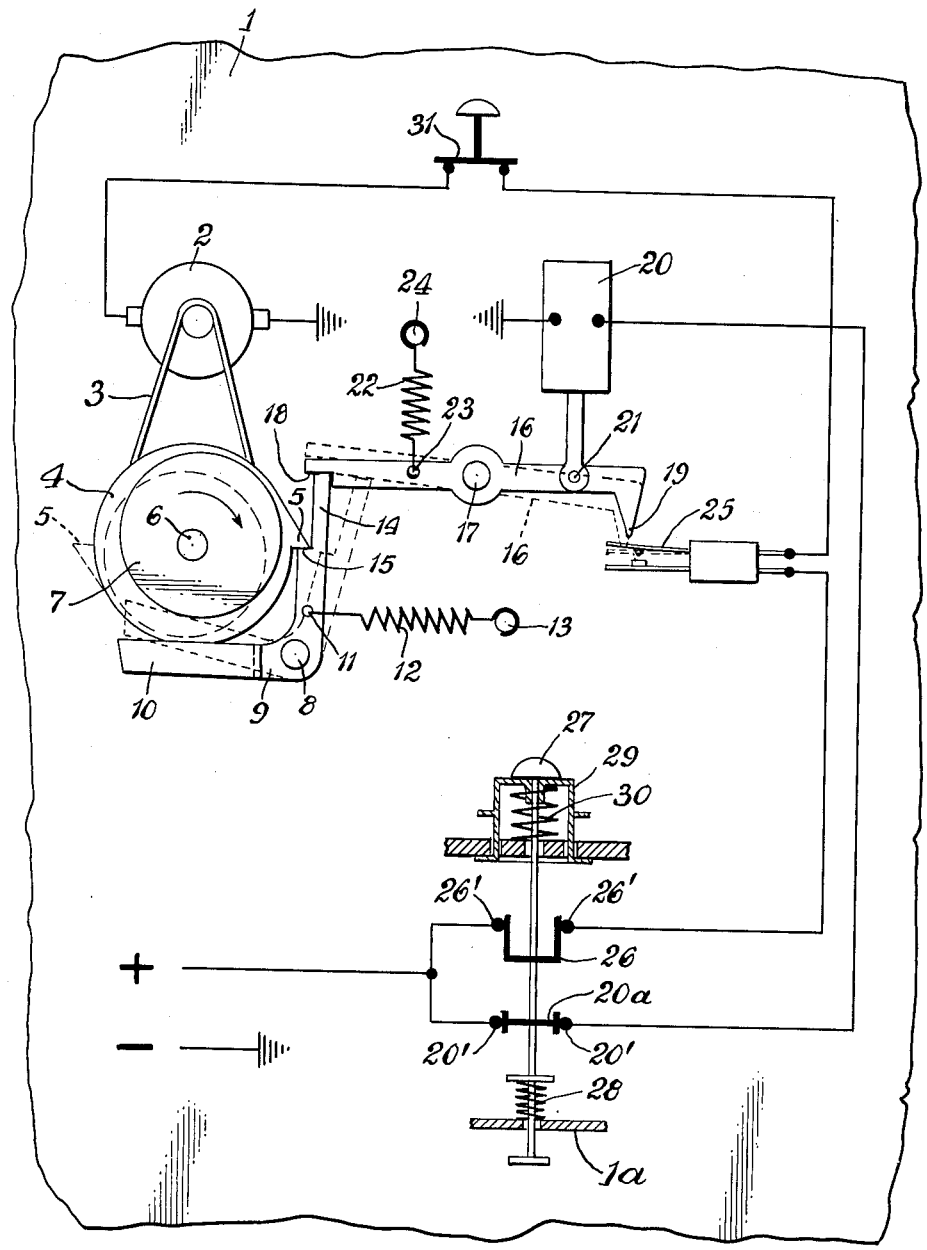
FIG. 2 illustrates the same switching device as FIG. 1, but the drive motor is in its locked position.
Figure 3:
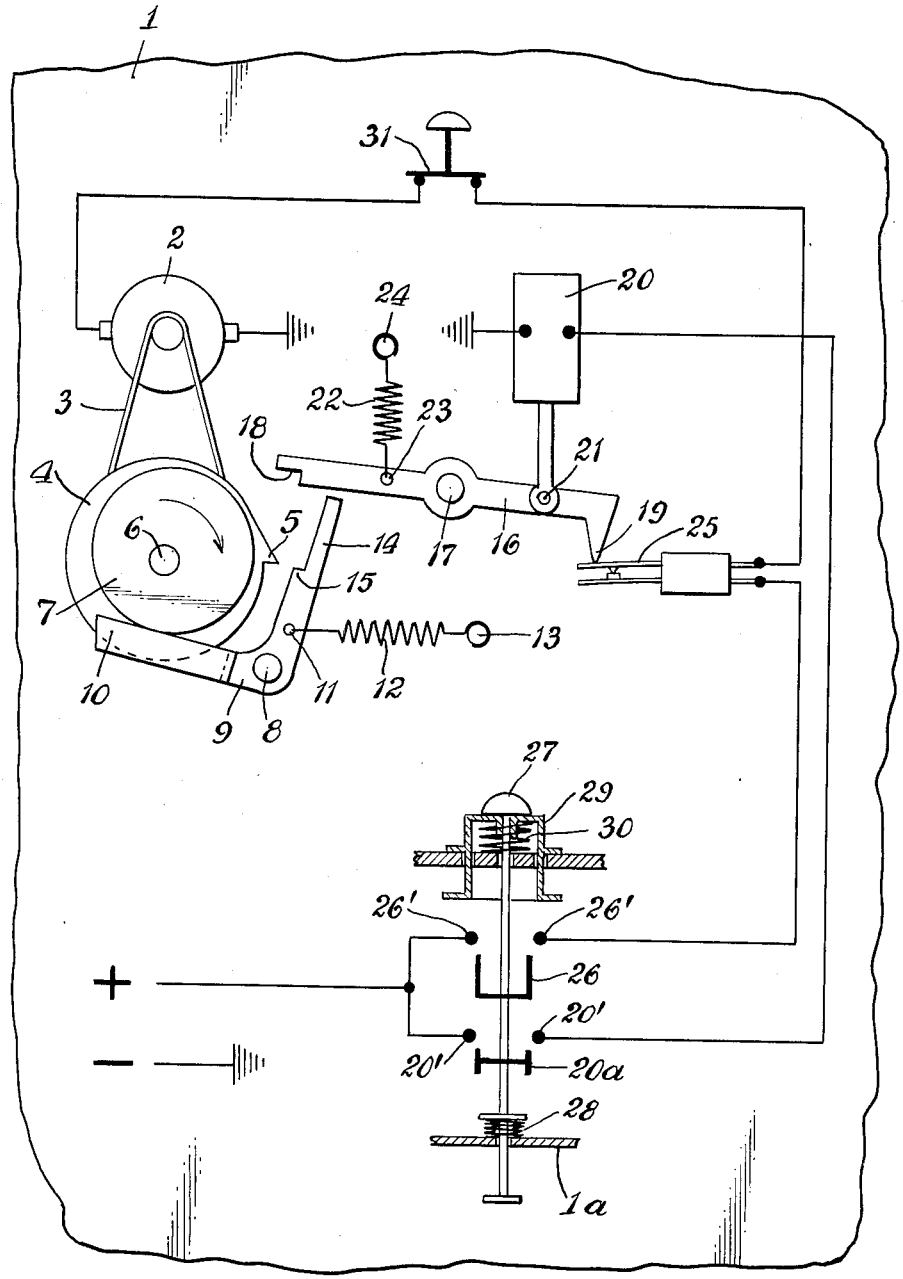
FIG. 3 illustrates the switching device of FIG. 1 in which the drive motor and an electromagnet are disconnected by a pressure key.

In the embodiment of the invention illustrated in the FIGS. 1 to 3 a push button switch 26 serves for controlling the above described switching arrangement.

The push button switch 26 is constructed for three different switching poistions in which it, firstly, keeps the supply circuit for the drive motor 2 closed and the supply circuit for the eletromagnet 20 open, secondly, keeps both supply circuits closed and, thirdly, holds both supply circuits open. The inner part of the push button switch 26 which carries a push button 27 is held in inoperative or rest position by the action of a spring 28 one end of which engages a wall 1a of the housing 1. The upper end of the inner part of the push button switch 26 is surrounded by a sleeve 29 which also encloses a spring 30. The push button 27 protrudes from the sleeve 29 a distance which is equal to the stroke of the first switching step.

Arranged in series with the push button switch 26 and the switch 25 is a switch 31 for turning the projector motor 2 on and off.

The operation of the switching device according to FIGS. 1–3 is as follows:

In the initial or inoperative position, respectively, of the push button switch 26 (FIG. 1) the supply circuit for the drive motor 2 is closed by means of conductive lines extending from the plus pole of the source to the contacts 26′ of the push button switch 26, the switch 25, the switch 31, the motor 2 and the minus pole or ground. The motor 2 operates at normal speed which means that the motion picture film is moved with a normal pitcure changing frequency.

The disc 4 and the control cam 7 rotate together with the shaft 6. The angular lever 9 whose arm 10 under the action of the spring 12 is held in engagement with the control cam 7, oscillates between the locking position and the inoperative position. The circumference of the control cam 7 is so offset with respect to the locking nose 5 that the latter and the locking shoulder 15 provided on the angular lever 9 always evade each other.

It is to be noted that in this position the two switch contacts 20′ in the supply circuit for the electromagnet 20 arranged on the push button switch 26 are kept open.

If the push button 27 is depressed by overcoming the force of the spring 28 until it strikes the top face of the sleeve 29, the two contacts 20′ are bridged by the bridge member 20a and the supply circuit for the electromagnet 20 is closed (FIG. 2) If the push button 27 is actuated during a releaes position of the angular lever 9 (as for instance shown in FIG. 1 and in dash lines in FIG. 2), the double-armed lever 16 under the action of the electromagnet 20 will engage the arm 14 of the angular lever 9 which for the time being prevents a further pivotal movement of the double-armed lever 16 and therewith prevents also an opening of the switch 25.

The control disc 7 during its further rotative movement in the direction of the arrow pushes the arm 10 of the angular lever 9 downwardly (broken line position of the control disc 7 in FIG. 2) until the angular lever 9 with its locking shoulder 15 has reached the locking position. After the lever 9 has reached the locking position, the double-armed lever 16 under the action of the electromagnet 20 with its recess 18 can drop in front of the arm 14 of the angular lever 9 and lock the same in this position. In this switch phase the locking nose 5 is in the position shown in FIG. 2 in broken lines.

At the same time the double armed lever 16 drops, the switch 25 opens and the drive motor 2 is switched off. Due to their mass inertia, the rotor of the motor 2, the disc 4, the control disc 7 and the shaft 6 with the objective shutter thereon keep moving until the locking nose 5 in an open position of the shutter engages the locking shoulder 15. During this time the control disc 7 has again moved away from the arm 10 of the angular lever 9 (FIG. 2).

Now the projected motion picture film stands still until the push button 27 is released (standstill projection).

If the electromagnet 20 is energized shortly before the locking position of the angular lever 9 is reached, the disconnection of the motor 2 and its locking takes place at once.

If now the push button 27 is depressed farther, the power of the spring 30 in the sleeve 29 has to be overcome in addition to that of the spring 28, and the sleeve 29 will be pushed downward (FIG. 3). This movement of the push button requires a distinctly noticeable effort of the operator and indicates to the operator the individual switch positions of the switch 26. During this second switching phase (FIG. 3) both the supply circuit for the projector motor 2 and the supply circuit for the electromagnet 20 are opened at the same time. The now deenergized electromagnet 20 permits the double-armed lever 16 to return into its inoperative position under the action of its spring 22 and the switch 25 will be closed. The drive motor 2, however, remains inoperative because its supply circuit is interrupted at the push button switch 26. When the push button 27 is permitted to return to its second position (FIG. 2), the projector motor 2 as well as the electromagnet 20 will be connected. The motor 2 starts to run, but the electromagnet 20 can not yet effect a movement of the double-armed lever 16. Now the process described in connection with the switching from normal operation to standstill projection is repeated. This results in an accurate movement of individual pictures.

If the last mentioned switching process is rhythmically repeated, a manual motion picture showing may be produced which resembles a slow motion effect provided the picture changing frequency is kept correspondingly low. The rhythm may selectively be varied within relatively wide limits.

Figure 4:
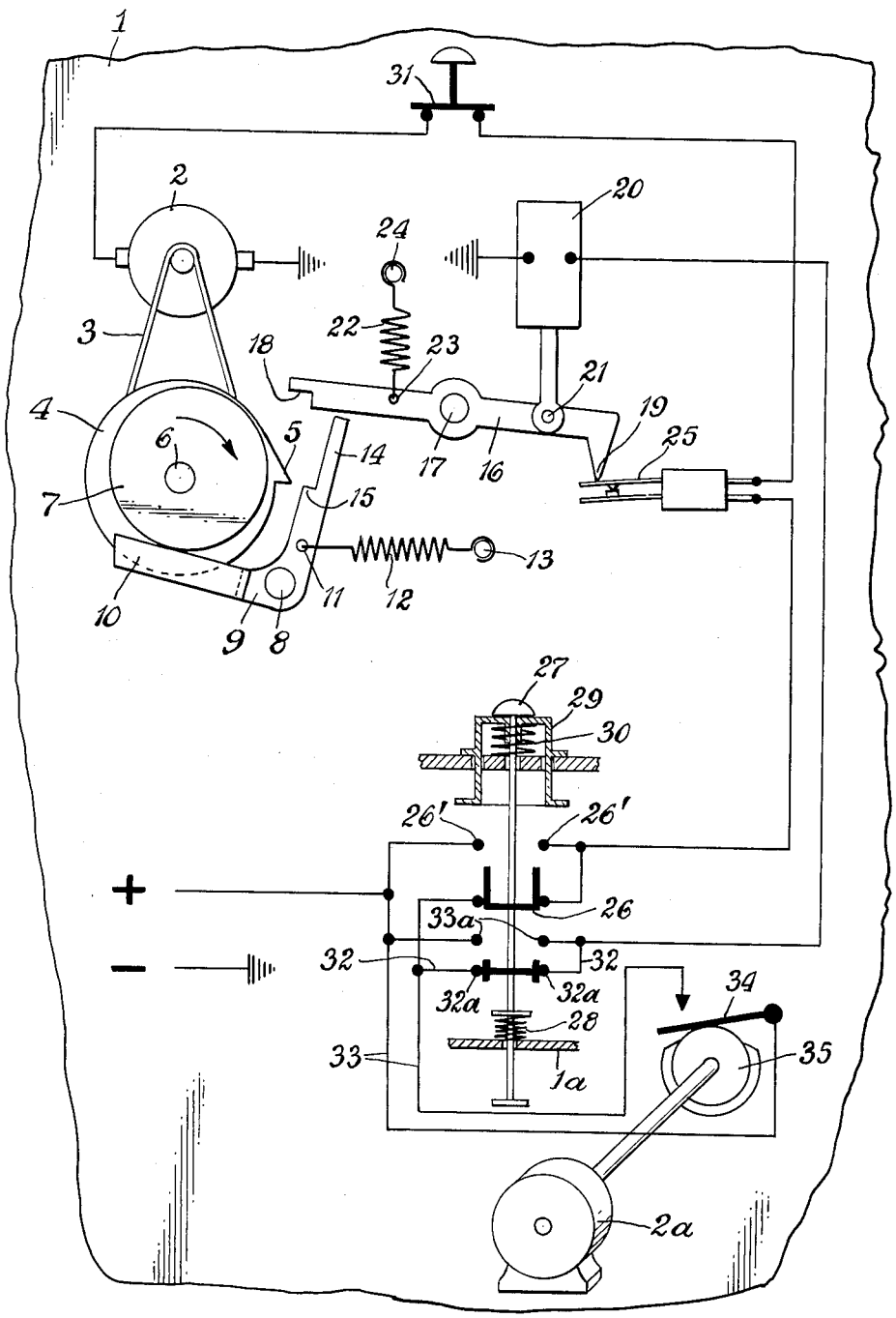
FIG. 4 illustrates the switching device similar to FIG. 1, but supplemented by a device for periodically moving a single picture by means of a motor driven control disc.

In the embodiment of the invention according to FIG. 4 the switching arrangement according to FIG. 1 is supplemented by providing the push button switch 26 with a fourth switch position. In this fourth switch position an additional switch 34 is inserted in the supply circuits for the drive motor 2 and the electromagnet 20 by means of electric lines 32 and 33 leading to contact pairs 32a and 33a, respectively. This additional switch 34 is periodically opened and closed by means of a control disc 35 driven by the ventilator motor 2a of the projector. This periodic opening and closing of the two mentioned supply circuits effects a controlled single picture movement which has the appearance of a slow motion performance.

The embodiment of the invention according to FIGS. 5, 6 and 7 produces a similar effect as the embodiment of FIG. 4.

The interior part of the push button switch 26 having the push button 27 thereon is provided with three contact pairs 27′, 27″, 27‴ and 36′, 36″, 36‴ each for the contact bridges 26a and 26b. The upper contact bridge 26a is associated with the supply circuit for the drive motor 2, and the lower contact bridge 26b is associated with the supply circuit for the electromagnet 20.

The supply circuit for the drive motor 2 as well as the one for the electromagnet 20 are first of all dependent upon the position of the contact bridge 26a. In the inoperative position, i.e. in the switch position 1 (FIG. 5), the supply circuit for the drive motor 2 is closed by the upper contact pair 27′ which is bridged by the contact bridge 26a. The contact pair 37′ connected by the contact bridge 26b in this position of the push button switch 26 is not included in the supply circuit for the electromagnet 20. Therefore, the electromagnet 20 is not energized.

In the position 2 of the push button switch 26 (FIG. 6) the contact bridge 26a continues to close the supply circuit for the drive motor 2 by bridging the center contact pair. The contact bridge 26b bridges the center contact pair 36″ associated with it and therewith closes the supply circuit for the electromagnet 20 because the center contact pair 36″ is connected with the lowermost contact pair 36‴ from which the conductor 20b leads to the electromagnet 20.

The lowermost contact pairs 27‴ and 36‴ associated with the contact bridges 26a and 26b in the position 3 (FIG. 7) of the push button switch 26 are connected to electric lines 37 and 38, respectively, which in turn can be connected to the contacts 39′ of a switch 39. The periodic opening and closing of the switch 39 is effected by the ventilator motor 2a of the projector. As is illustrated in FIGS. 5, 6 and 7, in the switch position 3 (FIG. 7) the supply circuit for the motor 2 as well as the supply circuit for the electromagnet 20 can only be closed by means of the switch 39.

The embodiment of the invention in the FIGS. 5, 6 and 7 therefore is equipped for:

(1) A conventional motion picture projection with normal picture changing frequency in the switch position 1 (FIG. 5);

(2) A still picture projection in the switch position 2 (FIG. 6), and (3) A projector controlled picture change having a slow motion effect by suitably selecting the opening and closing of the rotary switch 39.

In the switch position 3 at a low picture frequency the individual movement of pictures may be obtained simply by switching from position 2 (FIG. 6) to position 3 (FIG. 7) and again back to position 2 (FIG. 6). This individual switching from picture to picture is made possible by the ingenious switching arrangement with the double-armed lever 16 and the angular lever 9 (FIGS. 1 to 4) of the invention.

The embodiment of the invention according to the FIGS. 8, 9 and 10 shows a further simplification of the manual switch structure and an improvement of the slow motion effect obtainable by manual operation.

In an electric supply line 40, before it branches out at 41 into the supply circuit for the motor 2 and that for the electromagnet 20, is arranged a manually operable crankarm switch 42. In the supply circuit for the electromagnet 20, that is after the point 41, is arranged a push button switch 43.

In the switch position 1 shown in FIG. 8 the crankarm switch 42 remains closed and the push button switch 43 is opened. This switch position produces a normal motion picture projection.

In the switch position 2 shown in FIG. 9 both the crankarm switch 42 and the push button switch 43 are closed. As in the previous examples, this will produce a still projection of individual pictures on the film.

The possibility of moving individual pictures and of producing a slow motion effect is provided for by operating the crankarm switch 42, as illustrated in FIG. 10, starting from the switch position 2 shown in FIG. 9.

What we claim is:

1. In a switching device for motion picture projectors which selectively produces a conventional projection of motion pictures, a still projection of individual pictures on the film, a movement of individual pictures on the film and a slow motion effect by repeating rhythmically the movement of individual pictures on the film, the combination comprising:
   (a) a manually operable switch (26) provided with a plurality of selectively connectable pairs of contacts,
   (b) a drive motor (2) with a current supply circuit including a pair of said contacts,
   (c) a locking device (5, 9, 16) for said drive motor controlled by an electromagnet (20) in the current supply circuit of which is arranged another pair of said contacts,
   (d) a projector shutter shaft (6) driven by said motor and having mounted thereon a part of said locking device, said switch in one adjusted position closing said current supply circuit for said drive motor and holding the current supply circuit for said electromagnet open to produce said conventional motion picture projection, said switch in a second position closing said current supply circuit for said motor and the current supply circuit for said electromagnet, thereby operating said locking device and causing said motor and camera shutter shaft to stop in a position to perform a still projection, said switch in a third position opening the current supply circuits of both said motor and said electromagnet, thereby permitting a slow motion projection of the film by rhythmically moving said switch from said third position to said second position and from said second position to said third position.

2. A switching device according to claim 1, in which said manually operable switch is a push button operated switch which is moved into said first position by spring means (28), and is manually movable into said second position against the action of said spring means, another spring means (30) being provided the action of which has to be overcome when moving said switch from said second position to said third position.

3. A switching device according to claim 1, in which said manually operable switch is a push button operated switch which is moved into said first position by spring means (28), and is manually movable into said second position against the action of said spring means, another spring means (30) being provided the action of which has to be overcome when moving said switch from said second position to said third position, said other spring means (30) being arranged in an axially slidably mounted sleeve (29) through which a rod-like portion of said push button switch extends, said first switch position being reached when the button of said push button switch engages the adjacent closed end of said sleeve, said other spring (30) engaging with its ends a fixed abutment through which the open end of the sleeve extends.

4. A switching device according to claim 1, including a separate switch (34) arranged in a circuit arranged parallel to the pairs of contacts of said manually operable switch, means for periodically opening and closing said switch independently of said drive motor, and means connecting said switch with an additional pair of contacts provided on said manually operable switch in such a manner that upon closing said additional pair of contacts said slow motion effect is automatically produced.

5. A switching device according to claim 1, including a separate switch (34) arranged in a circuit arranged parallel to the pairs of contacts of said manually operable switch, a rotatable cam (35) driven by the ventilator motor of said projector for periodically opening and closing said separate switch, and means for connecting said switch with an additional pair of contacts provided on said manually operable switch in such a manner that upon closing said additonal pair of contacts said slow motion effect is automatically produced.

6. A switching device according to claim 1, in which said locking device includes a pivotally mounted double-armed lever (16) one arm of which is pivotally connected with said electromagnet (20) and normally closes a switch (25) arranged in the current supply circuit of said motor, and an angular locking lever (9) engaging a control cam (7) on said camera shutter shaft and adapted to lock said shaft in a predetermined position, therewith also preventing said drive motor from further rotation when said manually operable switch in its second position energizes said electromagnet in which said electromagnet causes said switch in the motor supply circuit to open.

7. A switching device according to claim 1, in which said locking device includes a pivotally mounted double-armed lever (16) one arm of which is pivotally connected with said electromagnet (20) and normally closes a switch (25) arranged in the current supply circuit of said motor, and an angular locking lever (9) engaging a control cam (7) on said camera shutter shaft and adapted to lock said shaft in a predetermined position, therewith also preventing said drive motor from further rotation when said manually operable switch in its second position energizes said electromagnet in which said electromagnet causes said switch in the motor supply circuit to open, said control cam (7) being non-rotatably mounted on said shutter shaft in fixed coaxial relation with a disc (4) carrying a locking nose (5) adapted to engage a locking shoulder on said angular lever (9) when the latter is engaged by said double-armed lever upon energization of said electromagnet.

8. A switching device according to claim 1, including an additional switch (39) arranged in series with the pairs of contacts on said manually operable switch, said switch being periodically opened and closed by a cam rotated by the ventilating motor of said projector, and in said third position of said manually operable switch causing an automatic slow motion projection of the motion picture film.

9. In a switching device for motion picture projectors which selectively produces a conventional projection of motion pictures, a still projection of individual pictures on the film, a movement of individual pictures on the film and a slow motion effect by repeating rhythmically the movement of individual pictures on the film, the combination comprising:

(a) a manually operable switch (42),
(b) a drive motor with a current supply circuit controlled by said switch,
(c) a locking device for said drive motor controlled by an electromagnet in the current supply circuit of which is arranged another manually operable switch (43),
(d) a camera shutter shaft (6) driven by said motor and having mounted thereon a part of said locking device, said first mentioned switch in one adjusted position closing said current supply circuit for said motor, while the current supply circuit for said electromagnet remains open to produce said conventional motion picture projection, said other switch when closed in addition to said first mentioned switch causing said electromagnet to be energized, thereby operating said locking device and causing said motor and camera shutter to stop in a position to perform a still projection, an alternate closing and opening of said first mentioned switch (42) when said other swtich (43) is closed permitting the movement of individual pictures on said film and a slow motion projection of the same.

10. A switching device according to claim 9, in which said first mentioned manually operable switch (42) is a cranklever operated switch.

References Cited by the Examiner
UNITED STATES PATENTS

| | | | |
|---|---|---|---|
| Re. 16,890 | 2/1928 | Kerestes | 352—169 |
| 3,139,793 | 7/1964 | Bradford et al. | 352—92 |
| 3,159,841 | 12/1964 | Castedello et al. | 352—104 |
| 3,178,721 | 4/1965 | Kamp | 352—169 |

JULIA E. COINER, *Primary Examiner*.